US009592487B2

(12) United States Patent
Ralston et al.

(10) Patent No.: US 9,592,487 B2
(45) Date of Patent: Mar. 14, 2017

(54) STEAM METHANE REFORMER SYSTEM AND METHOD OF PERFORMING A STEAM METHANE REFORMING PROCESS

(71) Applicant: ZoneFlow Reactor Technologies, LLC, Windsor, CT (US)

(72) Inventors: Michael P. Ralston, Jenks, OK (US); Jonathan Jay Feinstein, North Salem, NY (US)

(73) Assignee: ZONEFLOW REACTOR TECHNOLOGIES, LLC, Windsor, CT (US)

( * ) Notice: Subject to any disclaimer, the term of this patent is extended or adjusted under 35 U.S.C. 154(b) by 0 days.

(21) Appl. No.: 14/314,679

(22) Filed: Jun. 25, 2014

(65) Prior Publication Data

US 2015/0376003 A1    Dec. 31, 2015

(51) Int. Cl.
| | | |
|---|---|---|
| C01B 3/34 | (2006.01) | |
| B01J 8/00 | (2006.01) | |
| B01J 19/18 | (2006.01) | |
| C01B 3/38 | (2006.01) | |
| B01J 8/06 | (2006.01) | |

(52) U.S. Cl.
CPC ........... *B01J 19/1812* (2013.01); *B01J 8/062* (2013.01); *C01B 3/384* (2013.01); *B01J 2208/0053* (2013.01); *B01J 2208/00176* (2013.01); *B01J 2208/00495* (2013.01); *B01J 2208/00504* (2013.01); *C01B 2203/0233* (2013.01); *C01B 2203/0238* (2013.01); *C01B 2203/043* (2013.01); *C01B 2203/0827* (2013.01); *C01B 2203/0833* (2013.01); *C01B 2203/0883* (2013.01); *C01B 2203/0894* (2013.01); *C01B 2203/1235* (2013.01); *Y02P 20/124* (2015.11); *Y02P 20/142* (2015.11)

(58) Field of Classification Search
CPC ........................................................ C01B 3/34
See application file for complete search history.

(56) References Cited

U.S. PATENT DOCUMENTS

| | | | | |
|---|---|---|---|---|
| 7,297,169 B2* | 11/2007 | Pham | ....................... | B01J 8/062 |
| | | | | 423/650 |
| 2009/0013600 A1* | 1/2009 | Drnevich | ................ | C01B 3/382 |
| | | | | 48/127.7 |
| 2010/0086477 A1* | 4/2010 | Boyer | .................... | B01J 8/0257 |
| | | | | 423/648.1 |

FOREIGN PATENT DOCUMENTS

WO    WO 01-12310 A1    2/2001

\* cited by examiner

*Primary Examiner* — Matthew Merkling
(74) *Attorney, Agent, or Firm* — Robert P. Michael, Esq.; Carter, DeLuca, Farrell & Schmidt, LLP

(57) ABSTRACT

An apparatus includes a furnace having at least one bayonet reforming tube. The furnace is adapted to receive a gas including a hydrocarbon and at least one of steam and carbon dioxide via the bayonet reforming tube, heat and catalytically react the gas to form syngas at a first temperature, cool the syngas to a second temperature lower than the first temperature, and eject the syngas from the tube. The furnace has a first effluent stream including flue gas and a second effluent stream including syngas. The apparatus also includes a first heat recovery section adapted to transfer heat from the first effluent stream to a first heat load including one of air, water, and steam, and a second heat recovery section adapted to transfer heat from the second effluent stream to a second heat load.

4 Claims, 4 Drawing Sheets

STEAM METHANE REFORMER SYSTEM AND METHOD OF PERFORMING A STEAM METHANE REFORMING PROCESS

FIELD OF THE INVENTION

This invention relates generally to the field of chemical plant apparatus and methods, and more specifically to steam methane reformer systems and methods of performing a steam methane reforming process.

BACKGROUND

Steam methane reforming is a process that may be used to produce synthesis gas and hydrogen. A hydrocarbon and at least one of steam and carbon dioxide are reacted or reformed in the presence of a catalyst to produce hydrogen mixed with oxides of carbon, called synthesis gas or syngas. The reforming reaction is often performed within the radiant zone of a furnace heated by combustion of a fuel and an oxidant such as air.

Prior to entering the furnace the hydrocarbon is preheated, the steam, for example, is vaporized and superheated, the hydrocarbon and steam are combined into a common stream, and the resulting mixed feed is preheated against the flue gas to as high a temperature as possible to lower the firing requirements of the furnace and recover heat from the flue gas without causing the hydrocarbon to crack or precipitate solid carbon deposits. The desirably high temperature for the mixed feed to enter the furnace is normally in the range of 500° to 650° C., more often being about 650° C.

It is advantageous to recover heat from the resulting hot syngas and products of combustion or flue gas. Heat is normally recovered from the syngas in a first or syngas heat recovery section and from the flue gas in a second heat recovery section called a convective section.

Heat recovered from the syngas is utilized to preheat the hydrocarbon feedstock and to vaporize steam in what is called a process gas boiler.

The flue gas commonly performs diverse heating duties in the convective section. One duty is to vaporize and superheat steam. Another duty sometimes practiced is to preheat the air combusted in the furnace. An additional duty is to preheat the mixed feed of superheated steam and a preheated hydrocarbon feedstock to as high a temperature as possible without incurring carbon deposition.

Where efficient heat recovery is practiced, such as in a large steam methane reformer ("SMR"), the total amount of steam vaporized in the first and second heat recovery sections greatly exceeds the amount of steam required for the steam reforming process. The excess steam must be exported to another process unit in a chemical or power generation complex or refinery. Steam export typically reduces the net energy consumption of the SMR process by about 10%, which is substantial, but makes the SMR dependent on an external demand for the excess steam.

It is generally less expensive to build chemical plant equipment in a fabrication facility than in the field. SMR furnaces can be built in cylindrical form and assembled within a fabrication facility up to a very limited production capacity. For larger SMR furnace capacities it is necessary to build and assemble furnaces in the field. Although multiple modular furnaces may have lower installed costs than a single field assembled furnace, linking more than two furnaces to a common large flue gas heat recovery section is difficult. The difficulty in linking more than two furnaces to a common convective section is that the flow of fluids for the combination of heat duties of steam raising and superheating together with mixed feed preheating can become imbalanced between a single, common convective zone and three or more reforming furnaces. Multiple small convective sections have higher combined installed costs than a common, large convective section.

FIG. 1 illustrates an exemplary conventional bayonet reformer tube system 100. A bayonet reformer tube 101 is disposed within a furnace 102. The tube consists of an outer tube 103 and an inner tube 104. An annulus between the inner and outer tubes contains a reforming catalyst 105 (shown in FIG. 1 by cross-hatching). Gas enters the tube from an inlet header 106, flows downward through the annulus containing the catalyst, transfers to the inner tube 104 near a tip 107 of the tube, where the volumes of the annulus and inner tube are in communication with each other. The gas then flows upward from the tip 107 via the inner tube 104, and exits the tube to flow into an outlet header 108. Gas is heated and reformed in the annulus against combustion heating from the furnace and against the resulting heated syngas flowing through inner tube 104. Syngas flowing through inner tube 104 is cooled against the gas flowing through the annulus.

FIG. 2 illustrates a conventional SMR 200 and flow schematic. A hydrocarbon feedstock 281 enters SMR 200 via a line 202 and is conveyed to a heat exchanger 203 wherein the feedstock is heated against hot syngas. The preheated feedstock is conveyed by a line 204 to a desulfurization unit 205 wherein it is desulfurized and is then conveyed by a line 206 to a be mixed with superheated steam, together forming mixed feed.

Boiler feed water ("BFW") 282 enters SMR 200 via a line 207 which conveys the BFW to a heat exchanger 208 wherein the BFW is heated against hot syngas. The preheated BFW is conveyed by a line 209 to a heat exchanger 210 wherein it is vaporized against flue gas. The resulting steam is then conveyed by a line 211 to a heat exchanger 212 wherein it is superheated against flue gas. A portion of the superheated steam 283 in excess of the reformer requirements is exported from SMR 100 via a line 213. The balance of the superheated steam is conveyed via a line 214 wherein it is mixed with the feedstock, forming mixed feed, and to a heat exchanger 215, wherein the mixed feed is preheated to the inlet temperature of the reformer furnace. The preheated mixed feed is conveyed via a line 216 to a reformer tube 217 within a reformer furnace 218, wherein the mixed feed is heated and reformed against heat from the furnace. The resulting reformed hot syngas exits the furnace and is conveyed via a line 219 to heat exchanger 208 (which may be a process gas boiler, for example) wherein it is cooled against BFW, is conveyed via a line 220 to a water gas shift reactor 221 wherein some of the steam and carbon dioxide contained in the syngas react to form additional hydrogen and carbon dioxide, is conveyed via a line 222 to heat exchanger 203 wherein it is cooled against BFW, is conveyed via a line 223 to a fin fan (or heat exchanger) 224 wherein it is cooled against ambient air, is conveyed via a line 225 to a water knockout unit 226 wherein condensed steam is separated from the syngas, and is conveyed via a line 227 to a pressure swing adsorption or PSA unit 228 wherein most of the hydrogen is separated from the remainder of the syngas. Hydrogen 287 exits the PSA unit 228 as a hydrogen product via a line 229, and the remainder of the syngas exits the PSA unit 228 as a tail gas via a line 230 and is conveyed to the furnace burners wherein the tail gas is combusted.

Combustion air 284 enters SMR 200 and is conveyed via a line 231 to a heat exchanger 232 wherein it is preheated against flue gas. The preheated combustion air is conveyed via a line 233 to the furnace burners wherein the air is combusted with tail gas and supplemental fuel to heat the furnace. Supplemental fuel 286 enters SMR 200 and is conveyed via a line 234 to the furnace burners wherein it is combusted to heat the furnace. Combustion products exit the furnace as flue gas 285 via a convection section 236 and are progressively cooled as they sequentially pass through heat exchangers 215, 212, 210, and 232. The flue gas 285 then exits SMR 200.

SUMMARY

In accordance with an embodiment, an apparatus includes a furnace having at least one bayonet reforming tube. The furnace is adapted to receive a gas including a hydrocarbon and at least one of steam and carbon dioxide via the bayonet reforming tube, heat and catalytically react the gas to form syngas at a first temperature, cool the syngas to a second temperature lower than the first temperature, and eject the syngas from the tube. The furnace has a first effluent stream including flue gas and a second effluent stream including syngas. The apparatus also includes a first heat recovery section adapted to transfer heat from the first effluent stream to a first heat load including one of air, water, and steam, and a second heat recovery section adapted to transfer heat from the second effluent stream to a second heat load.

In one embodiment, the second heat load includes one of water, carbon dioxide, a hydrocarbon, and mixtures thereof.

In another embodiment, the apparatus includes a heat recovery section including one or more burners adapted to perform further heating of a load.

In another embodiment, the apparatus includes a first heat recovery section adapted to transfer heat from the first effluent stream to a first heat load including only one of air, water, steam, and a combination of air, water, and steam.

In another embodiment, the apparatus includes at least three furnaces and a single common first heat recovery section.

In another embodiment, the second temperature is less than 500° C.

In accordance with another embodiment, an apparatus for the production of syngas is provided. The apparatus includes a furnace that has at least one bayonet reforming tube. The furnace is adapted to receive a gas including a hydrocarbon and at least one of steam and carbon dioxide via the tube, heat and catalytically react the gas to form syngas at a first temperature, cool the syngas to a second temperature lower than the first temperature, wherein the second temperature is less than 500° C., and eject the syngas from the tube.

In another embodiment, the second temperature is less than 450° C.

In another embodiment, the second temperature is less than 400° C.

In another embodiment, the first temperature is greater than 700° C.

In accordance with another embodiment, an apparatus for the production of syngas is provided. The apparatus includes a furnace and at least one bayonet reforming tube including a first part disposed within the furnace and a second part disposed outside the furnace. The bayonet reforming tube further includes an outlet at a first end and a tip at a second end. The bayonet reforming tube has a total length from the outlet to the tip, wherein a portion of the total length that is outside the furnace is at least 10% of the total length. The bayonet reforming tube is adapted to receive a gas including a hydrocarbon and at least one of steam and carbon dioxide, heat and catalytically react the gas to form syngas at a first temperature, cool the syngas to a second temperature lower than the first temperature, and eject the syngas.

In another embodiment, the portion of the total length that is outside the furnace is at least 25% of the total length.

In accordance with another embodiment, a system for the production of syngas is provided. The system includes a furnace and at least one bayonet reforming tube including an inner tube, an outer tube, and an annulus between the inner tube and the outer tube. The bayonet tube is disposed only partly within the furnace. The bayonet reforming tube is adapted to receive a gas including a hydrocarbon and at least one of steam and carbon dioxide, heat and catalytically react the gas within the annulus to form syngas at a first temperature, cool the syngas within the inner tube to a second temperature lower than the first temperature, and eject the syngas. At least 5% of the heat transferred to the gas in the annulus is transferred to the gas in a portion of the annulus located outside the furnace.

In another embodiment, at least 15% of the heat transferred to the gas in the annulus is transferred to the gas in the portion of the annulus located outside the furnace.

In accordance with another embodiment, a method of producing syngas is provided. A gas including a hydrocarbon and at least one of steam and carbon dioxide is received into a furnace, via a bayonet reforming tube located at least partially within the furnace. The gas is heated and catalytically reacted to form syngas at a first temperature. The syngas is cooled to a second temperature lower than the first temperature, and the syngas is ejected from the tube. Heat from a first effluent stream including flue gas is transferred, at a first heat recovery section, to a first heat load including one of air, water, and steam. Heat from a second effluent stream including syngas is transferred, at a second heat recovery section, to a second heat load.

In another embodiment, the second heat load includes one of water, carbon dioxide, a hydrocarbon, and mixtures thereof.

In another embodiment, the second temperature is less than 500° C.

In another embodiment, the second temperature is less than 450° C.

In another embodiment, the second temperature is less than 400° C.

In another embodiment, heat from a first effluent stream including flue gas is transferred, at a first heat recovery section, to a first heat load that includes only one of air, water, steam, and a combination of air, water, and steam.

These and other advantages of the present disclosure will be apparent to those of ordinary skill in the art by reference to the following Detailed Description and the accompanying drawings.

DETAILED DESCRIPTION

Objectives of the present invention include at least partial, and preferably complete elimination of the process gas boiler, at least partial and preferably complete elimination of mixed feed preheating in the convective section, at least partial and preferably complete elimination of steam export in a steam methane reformer ("SMR") practicing efficient heat recovery, and significant reduction of the heat duty and hence the equipment costs, flue gas heat losses and emissions associated with the furnace and convective sections of an SMR. Another objective is to permit multiple modular reforming furnaces, such as three or more furnaces, to be linked to a single, common convective zone. Other objects of the present invention will be observed in the reading of this disclosure by one reasonably skilled in the art.

Figure 1:
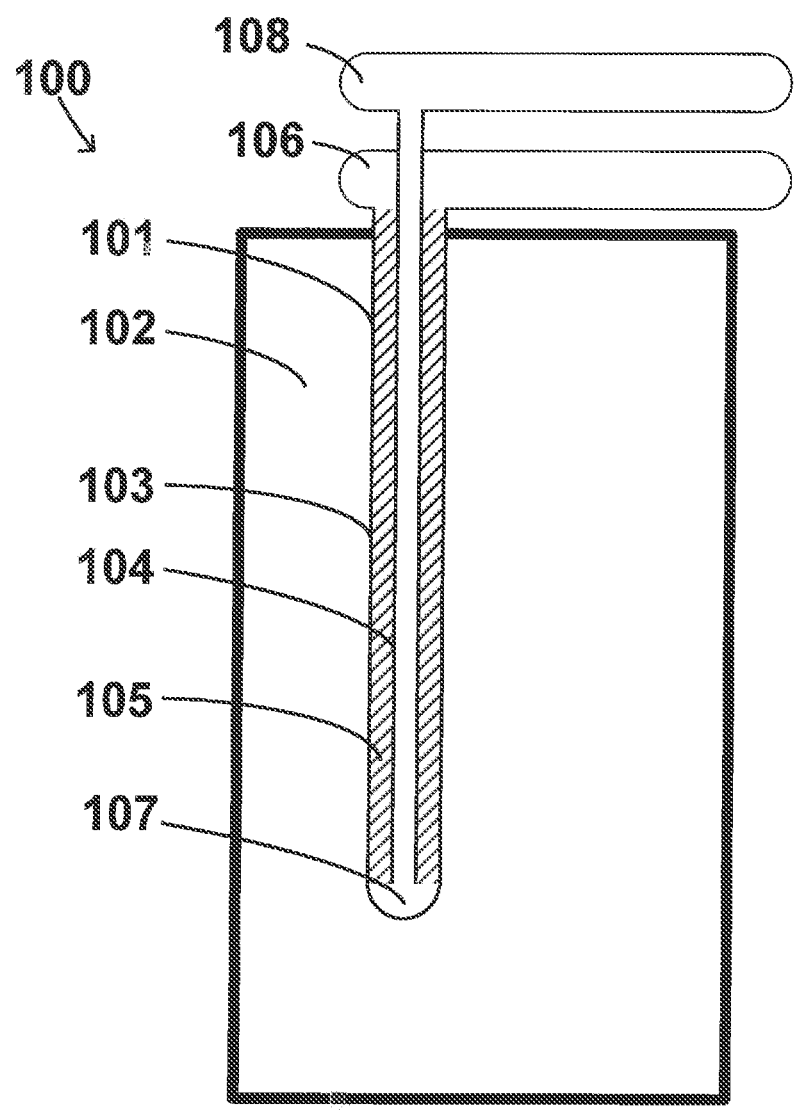
FIG. 1 shows an exemplary conventional bayonet reformer tube.
Figure 2:
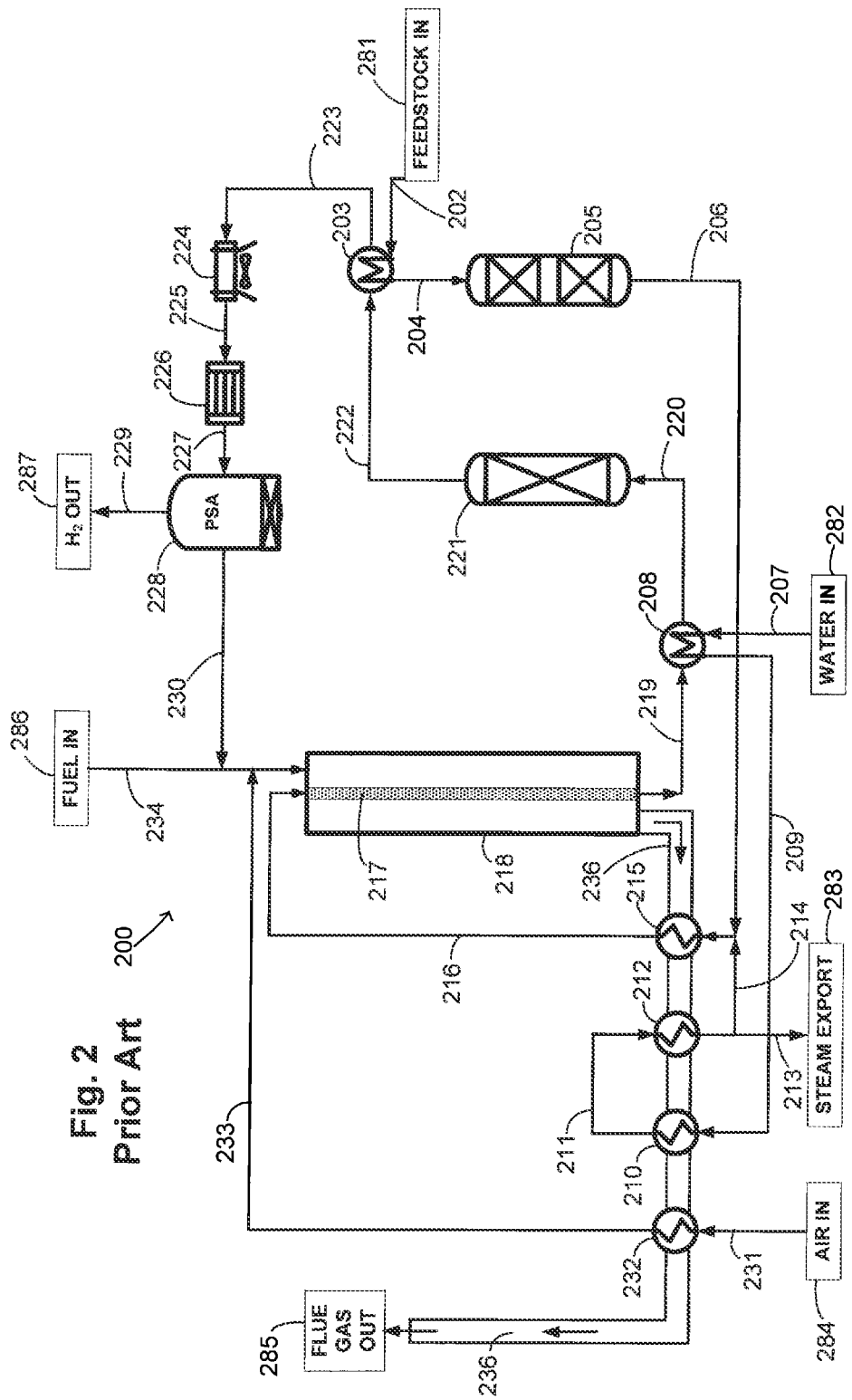
FIG. 2 shows an exemplary conventional steam methane reformer and flow schematic.
Figure 3:
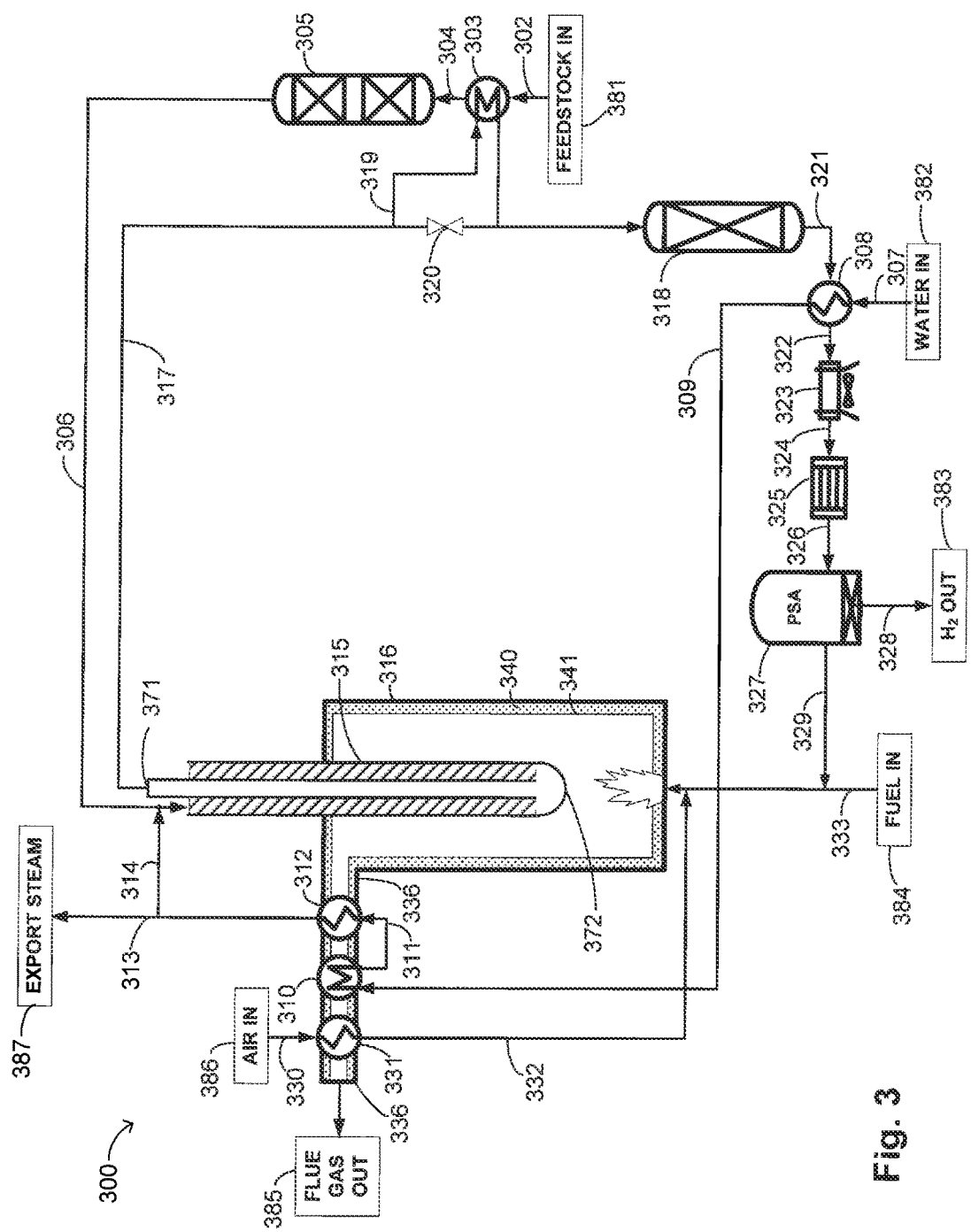
FIG. 3 shows a steam methane reformer and flow schematic in accordance with an embodiment.

FIG. 3 shows a steam methane reformer ("SMR") 300 and flow schematic in accordance with an embodiment. A hydrocarbon feedstock 381 enters SMR 300 via a line 302 and is conveyed to a heat exchanger 303 wherein the feedstock is heated against hot syngas. The preheated feedstock is conveyed by a line 304 to a desulfurization unit 305 wherein it is desulfurized and is then conveyed by a line 306 to be mixed with superheated steam, together forming mixed feed.

Boiler feed water ("BFW") 382 enters SMR 300 via a line 307 which conveys BFW 382 to a heat exchanger 308 wherein the BFW is heated against hot syngas. The preheated BFW is conveyed by a line 309 to a heat exchanger 310 wherein it is vaporized against flue gas. The resulting steam is then conveyed by a line 311 to a heat exchanger 312 wherein it is superheated against flue gas. A portion of the superheated steam 387 in excess of the reformer requirements is exported from the SMR 300 via a line 313. The balance of the superheated steam is conveyed via a line 314 to be mixed with the feedstock, forming mixed feed. The mixed feed is conveyed to a bayonet reformer tube 315 within a reformer furnace 316, wherein the mixed feed is heated and reformed against heat from the furnace 316. The furnace contains an insulation 340 (shown as a dotted region), the insulation 340 having a hot interior surface or hot face 341 forming a wall bounding a furnace volume within which furnace volume heat transfer occurs between the combustion gases and the heat load of gases within the tube.

The bayonet reforming tube 315 includes an outlet 371 at a first end and a tip 372 at a second end, wherein the bayonet reforming tube 315 has a total length from the outlet to the tip. In one embodiment, a portion of the total length that is outside the furnace is at least 10% of the total length. In another embodiment, a portion of the total length that is outside the furnace is at least 25% of the total length.

The mixed feed is heated and reacted to form a syngas in the bayonet tube (e.g., heated to a first temperature). The resulting reformed hot syngas, is cooled and exits the furnace 316 and exits the bayonet tube 315 at the outlet 371 of the bayonet tube (e.g., cooled to a second temperature) and is conveyed via a line 317 to a water gas shift reactor 318 wherein some of the steam and carbon dioxide contained in the syngas react to form additional hydrogen and carbon dioxide. Some of the syngas in line 317 is diverted via a line 319 to pass through heat exchanger 303 wherein it is cooled against inlet feedstock and returned to line 317. Valve 320, for example, may control the amount of syngas so diverted. The syngas is conveyed from water gas shift reactor 318 via a line 321 to heat exchanger 308 wherein it is cooled against BFW, is further conveyed via a line 322 to a fin fan (or heat exchanger) 323 wherein it is cooled against ambient air, is conveyed via a line 324 to a water knockout unit 325 wherein condensed steam is separated from the syngas, and is conveyed via a line 326 to a PSA unit 327 wherein most of the hydrogen is separated from the remainder of the syngas. A purified hydrogen stream 383 exits the PSA unit 327 as a hydrogen product via a line 328, and the remainder of the syngas exits the PSA unit 327 as a tail gas via a line 329 and is conveyed to the furnace burners wherein the tail gas is combusted.

Combustion air 386 enters the SMR 300 and is conveyed via a line 330 to a heat exchanger 331 wherein it is preheated against flue gas. The preheated combustion air is conveyed via a line 332 to the furnace burners wherein the air is combusted with tail gas and supplemental fuel to heat the furnace.

Supplemental fuel 384 enters the SMR 300 and is conveyed via a line 333 to the furnace burners wherein it is combusted to heat the furnace. Combustion products exit the furnace as flue gas 385 via a convection section 336 and are progressively cooled as they sequentially pass through heat exchangers 312, 310, and 330. The flue gas 385 then exits the SMR 300.

In one embodiment, all hydrocarbon and mixtures containing the hydrocarbon are substantially heated in heat recovery sections other than the first heat recovery section. In the illustrative embodiment of FIG. 3, convection section 336 and heat exchangers 310, 312, and 330 contained therein constitute a first heat recovery section in which steam, boiler feed water, and air are exclusively heated against hot flue gas 385. Heat exchangers 303, 308, and 323 in which syngas is progressively cooled against at least hydrocarbon feedstock 381 constitutes a second heat recovery section.

In one embodiment, at least 5% of the heat transferred to the gas in the annulus of bayonet reforming tube 315 is transferred to the gas in a portion of the annulus located outside of furnace 316. In another embodiment, at least 15% of the heat transferred to the gas in the annulus is transferred to the gas in the portion of the annulus located outside the furnace.

Figure 4:
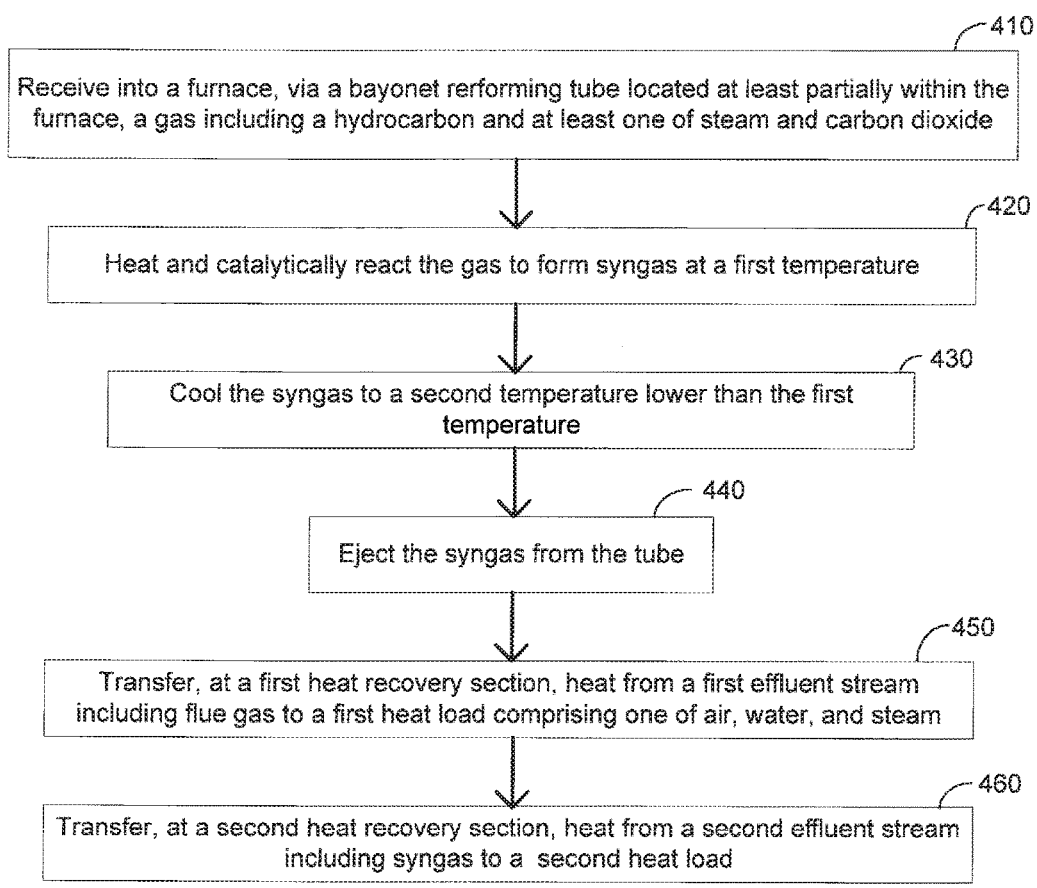
FIG. 4 is a flowchart of a method of producing syngas in accordance with an embodiment.

In another embodiment, a method of producing syngas is provided. FIG. 4 is a flowchart of a method of producing syngas in accordance with an embodiment. At step 410, a gas including a hydrocarbon and at least one of steam and carbon dioxide is received into a furnace, via a bayonet reforming tube located at least partially within the furnace. At step 420, the gas is heated and catalytically reacted to form syngas at a first temperature. At step 430, the syngas is cooled to a second temperature lower than the first temperature. At step 440, the syngas is ejected from the tube. At step 450, heat from a first effluent stream including flue gas is transferred, at a first heat recovery section, to a first heat load including one of air, water, and steam. At step 460, heat from a second effluent stream including syngas is transferred, at a second heat recovery section, to a second heat load.

Thus, in accordance with one embodiment, an apparatus includes a furnace having at least one bayonet reforming tube. The furnace is adapted to receive a gas including a hydrocarbon and at least one of steam and carbon dioxide via the bayonet reforming tube, heat and catalytically react the gas to form syngas at a first temperature, cool the syngas to a second temperature lower than the first temperature, and eject the syngas from the tube. The furnace has a first effluent stream including flue gas and a second effluent stream including syngas. The apparatus also includes a first heat recovery section adapted to transfer heat from the first effluent stream to a first heat load including one of air, water, and steam, and a second heat recovery section adapted to transfer heat from the second effluent stream to a second heat load.

In one embodiment, the second heat load includes one of water, carbon dioxide, a hydrocarbon, and mixtures thereof.

In another embodiment, the apparatus includes a heat recovery section including one or more burners adapted to perform further heating of a load.

In another embodiment, the apparatus includes a first heat recovery section adapted to transfer heat from the first effluent stream to a first heat load including only one of air, water, steam, and a combination of air, water, and steam.

In another embodiment, the apparatus includes at least three furnaces and a single common first heat recovery section.

In another embodiment, the second temperature is less than 500° C.

In accordance with another embodiment, an apparatus for the production of syngas is provided. The apparatus includes a furnace that has at least one bayonet reforming tube. The furnace is adapted to receive a gas including a hydrocarbon and at least one of steam and carbon dioxide via the tube, heat and catalytically react the gas to form syngas at a first temperature, cool the syngas to a second temperature lower than the first temperature, wherein the second temperature is less than 500° C., and eject the syngas from the tube.

In another embodiment, the second temperature is less than 450° C.

In another embodiment, the second temperature is less than 400° C.

In another embodiment, the first temperature is greater than 700° C.

In accordance with another embodiment, an apparatus for the production of syngas is provided. The apparatus includes a furnace and at least one bayonet reforming tube including a first part disposed within the furnace and a second part disposed outside the furnace. The bayonet reforming tube further includes an outlet at a first end and a tip at a second end. The bayonet reforming tube has a total length from the outlet to the tip, wherein a portion of the total length that is outside the furnace is at least 10% of the total length. The bayonet reforming tube is adapted to receive a gas including a hydrocarbon and at least one of steam and carbon dioxide, heat and catalytically react the gas to form syngas at a first temperature, cool the syngas to a second temperature lower than the first temperature, and eject the syngas.

In another embodiment, the portion of the total length that is outside the furnace is at least 25% of the total length.

In accordance with another embodiment, a system for the production of syngas is provided. The system includes a furnace and at least one bayonet reforming tube including an inner tube, an outer tube, and an annulus between the inner tube and the outer tube. The bayonet tube is disposed only partly within the furnace. The bayonet reforming tube is adapted to receive a gas including a hydrocarbon and at least one of steam and carbon dioxide, heat and catalytically react the gas within the annulus to form syngas at a first temperature, cool the syngas within the inner tube to a second temperature lower than the first temperature, and eject the syngas. At least 5% of the heat transferred to the gas in the annulus is transferred to the gas in a portion of the annulus located outside the furnace.

In another embodiment, at least 15% of the heat transferred to the gas in the annulus is transferred to the gas in the portion of the annulus located outside the furnace.

In accordance with another embodiment, a method of producing syngas is provided. A gas including a hydrocarbon and at least one of steam and carbon dioxide is received, into a furnace, via a bayonet reforming tube located at least partially within the furnace. The gas is heated and catalytically reacted to form syngas at a first temperature. The syngas is cooled to a second temperature lower than the first temperature, and the syngas is ejected from the tube. Heat from a first effluent stream including flue gas is transferred, at a first heat recovery section, to a first heat load including one of air, water, and steam. Heat from a second effluent stream including syngas is transferred, at a second heat recovery section, to a second heat load.

In another embodiment, the second heat load includes one of water, carbon dioxide, a hydrocarbon, and mixtures thereof.

In another embodiment, the second temperature is less than 500° C.

In another embodiment, the second temperature is less than 450° C.

In another embodiment, the second temperature is less than 400° C.

In another embodiment, heat from a first effluent stream including flue gas is transferred, at a first heat recovery section, to a first heat load that includes only one of air, water, steam, and a combination of air, water, and steam.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. An apparatus comprising:
   at least two furnaces, each comprising at least one bayonet reforming tube, each furnace being adapted to:
      receive a process gas comprising a hydrocarbon and at least one of steam and carbon dioxide via the bayonet reforming tube;
      heat and catalytically react the process gas to form syngas at a first temperature;
      cool the syngas to a second temperature lower than the first temperature; and
      eject the syngas from the tube;
      wherein each of the at least two furnaces has a flue gas effluent stream and a syngas effluent stream;
   a single common heat recovery section operably connected to each of the at least two furnaces, wherein the flue gas effluent streams of each of the at least two furnaces are in thermal communication with a heat load within the common heat recovery section,
   wherein the process gas of each of the at least two furnaces bypasses the single common heat recovery section before being received by a respective bayonet reforming tube of each of the at least two furnaces.

2. The apparatus of claim 1 further comprising:
   a heat recovery section comprising one or more burners adapted to perform further heating of a load.

3. The apparatus of claim 1, further comprising at least three furnaces and a single common first heat recovery section.

4. The apparatus of claim 1, wherein the heat load comprises:
   a first heat exchanger in which heat is exchanged between the common flue gas effluent stream and steam;

a second heat exchanger in which heat is exchanged between the common flue gas effluent stream and boiler feed water; and a third heat exchanger in which heat is exchanged between the common flue gas effluent stream and air.

* * * * *

UNITED STATES PATENT AND TRADEMARK OFFICE
CERTIFICATE OF CORRECTION

| | | |
|---|---|---|
| PATENT NO. | : 9,592,487 B2 | Page 1 of 1 |
| APPLICATION NO. | : 14/314679 | |
| DATED | : March 14, 2017 | |
| INVENTOR(S) | : Ralston et al. | |

It is certified that error appears in the above-identified patent and that said Letters Patent is hereby corrected as shown below:

On the Title Page

(74) Attorney, Agent, or Firm, change "Robert P. Michael, Esq." to --Robert P. Michal, Esq.--

Signed and Sealed this
Ninth Day of May, 2017

Michelle K. Lee
*Director of the United States Patent and Trademark Office*